P. P. Quimby.
Steering.
N° 7,197. Patented Mar. 19, 1850.

UNITED STATES PATENT OFFICE.

PHINEAS P. QUIMBY, OF BELFAST, MAINE.

STEERING APPARATUS.

Specification of Letters Patent No. 7,197, dated March 19, 1850.

*To all whom it may concern:*

Be it known that I, PHINEAS P. QUIMBY, of Belfast, in the county of Waldo and State of Maine, have invented a new and useful Machine for Steering Ships and Steamboats, which is entitled "Quimby's Patent Steering-Gear," and I do declare that the following is a full, clear, and exact description of the construction and operation of the same, reference being had to the annexed drawings, making a part of this specification, in which—

Figure 2:
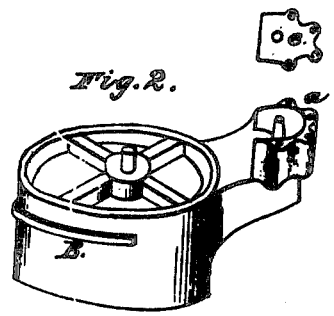
Figure 3:
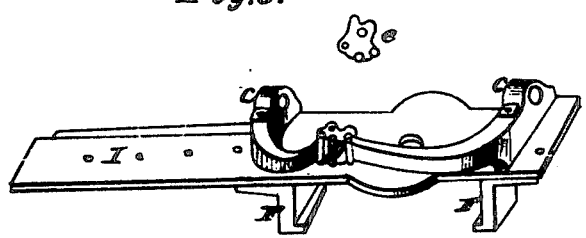
Figure 4:
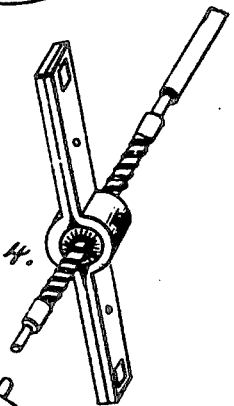
Figure 1:
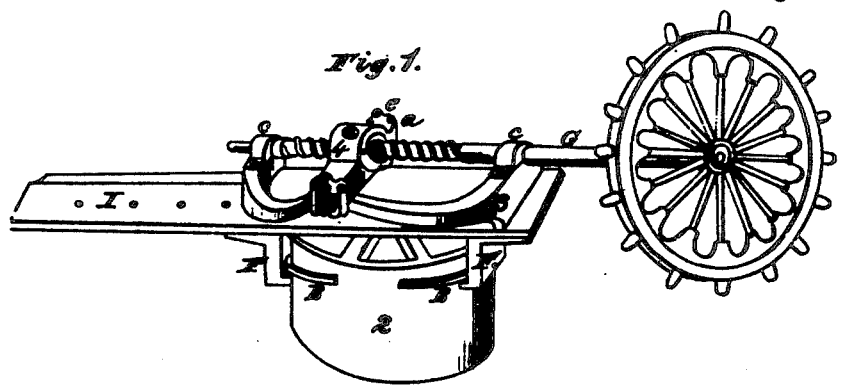

Figure 1 is a perspective view of the whole machine. Figs. 2, 3, and 4 are detached parts of the same, with references showing the mode in which the same goes together, as follows:

Fig. 2 is a band attached to the rudder head with a pintle in the center, as shown in the drawing. A, is a socket-joint on Fig. 2. B is a flange on Fig. 2.

Fig. 3 is a half circle or bow with a hole in the center or cross piece which fits on to the pintle in the center of Fig. 2. C, C, are boxes at the ends of the cross piece of the bow 3. D, is a socket joint in Fig. 3 corresponding to a similar one in Fig. 2 (marked *a*). E, E, are caps for said socket joints. F, F, are dogs attached to the under side of Fig. 3 which plays in the flanges marked B, on Fig. 2.

Fig. 4 is a lever made in two parts with half rounds in the center which when together make a circle to inclose the revolving nut which is fitted and held in by trunnions inserted in the circular part of lever above and below. The lever is fastened together with two screws. At each end of the lever is a groove or slot which receives the pin in the socket on bow 3 and band 2.

Letter G is the screw (to which is attached the steering wheel) which turns in the boxes on the ends of the center piece of bow 3 marked *c, c*.

Letter H is the nut (through which the screw passes) in the center of lever 4 fitted in with trunnions which play in the circular part of the lever.

Letter I is a continuation of the center piece of bow 3 by which the machine is secured to the deck of the vessel. The whole to be made of cast iron or other metal. I am aware that a screw placed athwartships and acting upon a turning and traveling nut attached directly to the tiller or its equivalent on the rudder head, has been employed for the purpose of steering vessels. I therefore do not claim the invention of that arrangement.

In my apparatus I introduce the lever Fig. 4 for the purpose of moving the rudder with the same length of tiller, through a given space with less turns of the wheel than can be done in any other way with the same pitch of screw, by which I obviate a great objection in former apparatus for steering, to wit: the want of command over the rudder by reason of the great number of turns of the wheel, or the great friction produced by increasing the pitch of the screw. These being the only two modes used by former inventors for obtaining the velocity in the movement of the rudder, to wit: shortening the tiller or increasing the pitch of the screw.

In my apparatus any required velocity in the movement of the rudder may be obtained with the same length of tiller by diminishing or increasing the length of my lever, without increasing the pitch of the screw, as increasing the pitch of the screw or shortening the tiller makes it operate stiffly and unnaturally. And in fact I am enabled by the introduction of the lever to obtain that particular combination of power and velocity which the exigency of all occasions may demand in an apparatus for steering vessels.

Therefore what I claim as my invention and desire to secure by Letters Patent, is—

Attaching the nut acted upon by the screw, to an interposing lever, arranged substantially as herein described by which arrangement I am enabled with the same pitch of screw and the same number of revolutions of the wheel to move the rudder through a larger arc than in the old apparatus.

P. P. QUIMBY.

Witnesses:
ANDREW P. PALMER,
WM. JOHN BOWMAN.